Aug. 5, 1924.　　　　　　　　　　　　　　　　　1,503,875
O. E. BORNHAUSER ET AL
APPARATUS FOR MAKING BUILDING BLOCKS AND THE LIKE
Filed Jan. 18, 1923　　2 Sheets-Sheet 1
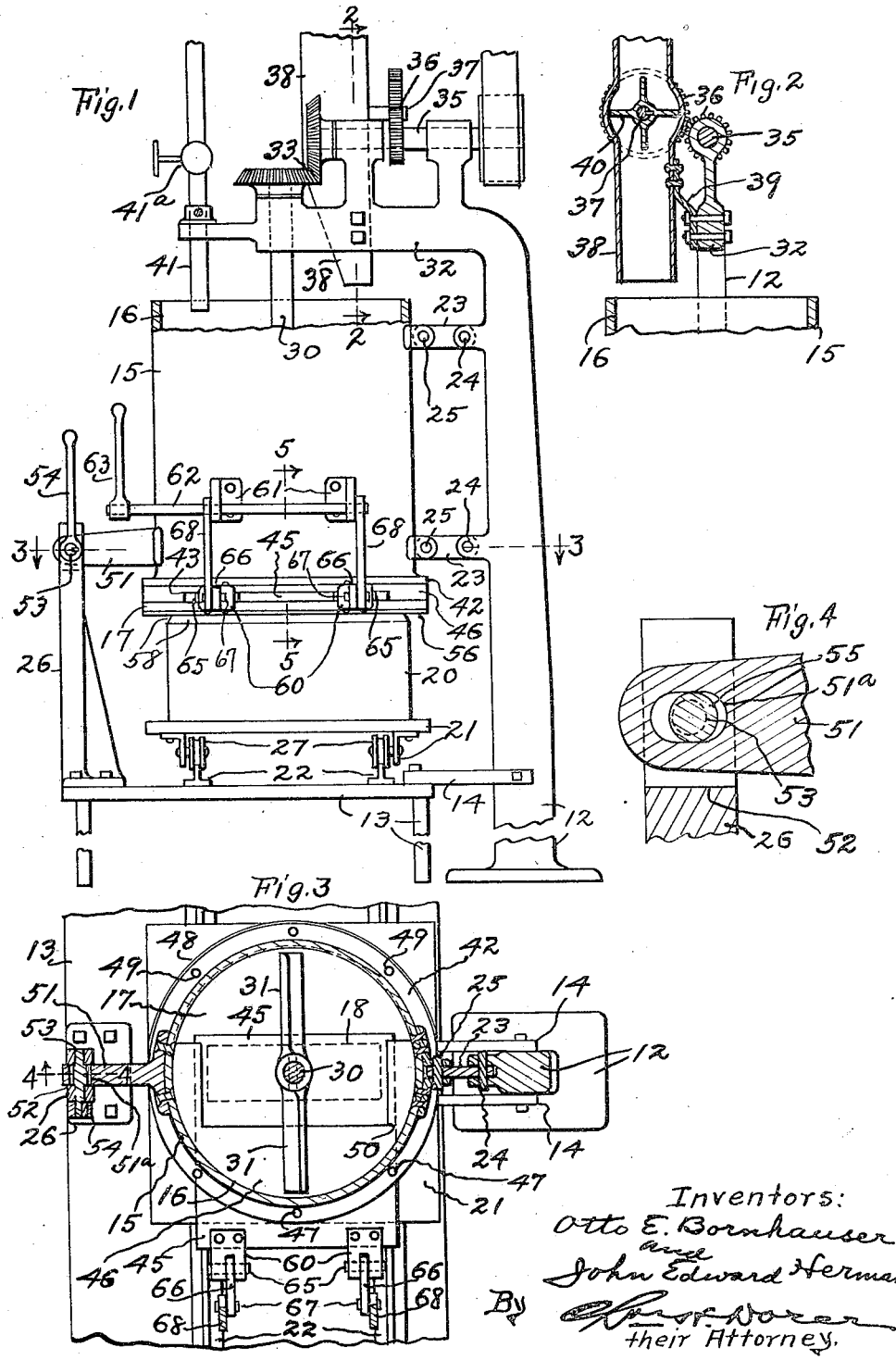

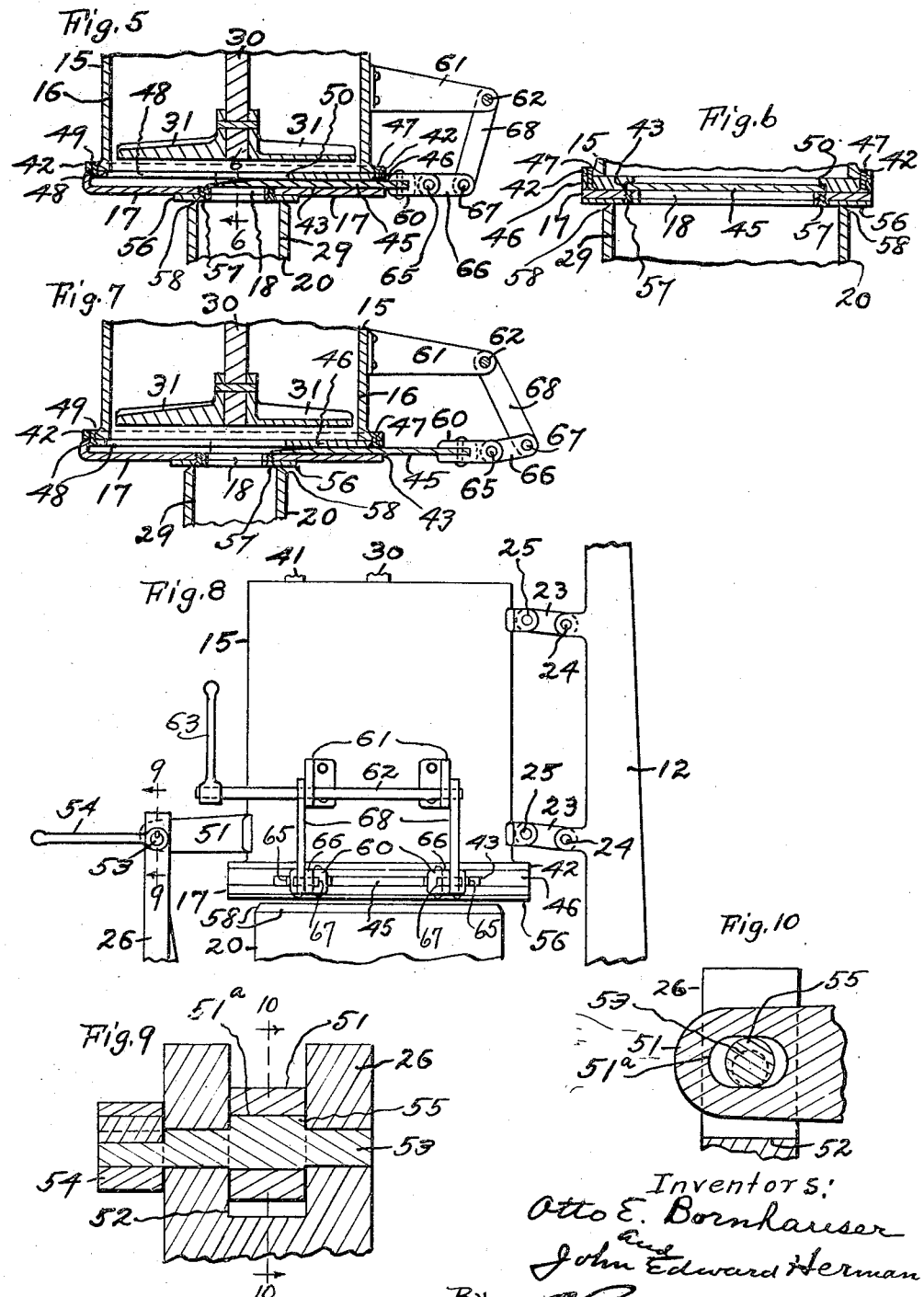

Patented Aug. 5, 1924.

1,503,875

UNITED STATES PATENT OFFICE.

OTTO E. BORNHAUSER AND JOHN EDWARD HERMAN, OF SANDUSKY, OHIO.

APPARATUS FOR MAKING BUILDING BLOCKS AND THE LIKE.

Application filed January 18, 1923. Serial No. 613,363.

*To all whom it may concern:*

Be it known that we, OTTO E. BORNHAUSER and JOHN EDWARD HERMAN, citizens of the United States, residing at Sandusky, in the county of Erie and State of Ohio, have invented a new and useful Apparatus for Making Building Blocks and the like, of which the following is a specification.

This invention relates to apparatus for making building blocks and the like, and pertains more especially to apparatus comprising a hopper for receiving water and finely divided dry materials consisting, in the main, of gypsum and to be stirred and mixed in said hopper to produce the required wet cementitious mass preparatory to feeding cementitious material from said mass into a mold.

One object of this invention is to have the material-discharging opening of said hopper preferably centrally of the bottom of the hopper, to provide a substantially horizontal flat cut-off supported from the hopper controlling the feed of material through said opening, and to render the construction of the lower and cut-off-carrying end portion of the hopper highly practical not only for the application and operation of the cut-off but for the delivery of material from the hopper into a mold positioned under said opening.

Another object is to prevent leakage between the bottom of the hopper and the top edges of said mold while charging the mold with material from the hopper.

Another object is to provide the hopper, at the under side of its bottom, with a desirable packing around the lower end of the hereinbefore mentioned opening so as to form a substantially fluid-tight joint between the mold and the hopper preparatory to and during the charging of the mold, and to have the hopper liftable with facility from the mold upon charging the mold so as to permit movement of the charged mold horizontally from under the mold without mutilating said packing.

Another object is to render our improved apparatus simple in construction, reliable in its operation, and not liable to get out of order.

With these objects in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a side elevation, partly in section, of apparatus embodying our invention, and portions are broken away in this figure to reduce the size of the drawing. Fig. 2 is a vertical section taken along the line 2—2 in Fig. 1. Fig. 3 is a horizontal section taken along the line 3—3 in Fig. 1. Fig. 4 is a vertical section, in detail, taken along the line 4—4 in Fig. 3. Fig. 5 is a vertical section taken along the line 5—5 in Fig. 1. Fig. 6 is a vertical section taken along the line 6—6 in Fig. 5. Fig. 7 is a vertical section corresponding with Fig. 5, except that in Fig. 7 the cut-off for controlling the discharge of material from the hopper is shown open whereas in Fig. 6 said cut-off is shown closed. Fig. 8 shows a portion of Fig. 1, except that in Fig. 8 the hopper is shown in its upper position whereas Fig. 1 shows the hopper in its lower position. Fig. 9 is a vertical section taken along the line 9—9 in Fig. 8. Fig. 10 is a vertical section taken along the line 10—10 in Fig. 9. Figs. 4, 9 and 10 are drawn on a larger scale than Figs. 1, 2, 3, 5, 6, 7 and 8.

Our improved apparatus comprises a supporting frame work or structure which (see Figs. 1 and 3) preferably comprises a standard 12 and a platform 13, and said platform is arranged adjacent the lower end portion of said standard. Said standard and said platform are tied together by tie-bars 14.

Our improved apparatus also comprises a hopper the body 15 of which consists preferably of a vertical or upright metal shell, and the interior chamber 16 of said hopper is open at the upper end of the hopper, as shown in Figs. 1 and 2, to permit the supply of water and dry materials to said chamber for producing a wet cementitious mass in the hopper. The bottom of the hopper comprises a substantially horizontal metal plate 17 applied and secured in place as will hereinafter appear, and said plate is provided centrally with a discharge-opening 18, as shown in Figs. 5, 6 and 7.

Said hopper (see Figs. 1 and 3) is movable vertically as will hereinafter appear, and arranged over the platform 13 and spaced from said platform far enough to permit the interposition of a mold 20 and mold-carriage 21 between the hopper and a horizontal track 22 on said platform. The hopper-body 15 is spaced from the standard 12 and connected to said standard by two vertically spaced parallel rigid links 23 each of which extends between said standard and the hopper and is horizontally pivoted at one end, as at 24, to said standard and at its other end, as at 25, to the hopper-body. The axes of the pivotal connections between the hopper and the links 23 and the axes of the pivotal connections between the standard 12 and said links are parallel. It will be observed that the links 23 are movable in a vertical plane as required to permit vertical movement of the hopper. The hopper is, therefore, pivotally connected at one side to the standard 12, and we would here remark that the platform 13 (see Figs. 1 and 3) is provided, at the opposite side of the hopper, with an upright supporting member 26 spaced from the hopper and participating in the support of the hopper as will hereinafter appear.

The track 22 (see Figs. 1 and 3) is arranged between the standard 12 and the supporting member 26 and parallel with the hereinbefore mentioned pivotal connections between the hopper and said standard 12 and engaged by the wheels 27 of the carriage 21 adapted to be employed in carrying the mold 20 in under and from under the hopper. The material-receiving chamber 29 of said mold is open at the upper end of the mold, as shown in Figs. 5, 6 and 7. In Figs. 1, 5, 6 and 7 the mold 20 is shown in its material-receiving position under the hopper, and it will be observed that the chamber 29 of the mold is in line vertically with the opening 18 in the plate 17 when the mold is in said position, so that in said position of the mold said opening is arranged to discharge into said chamber.

Centrally of the hopper is a vertical stirring shaft 30 which (see Figs. 3, 5 and 7) is provided at its lower end with laterally extending arms 31 for stirring and mixing the water and dry materials supplied to the hopper-chamber 16, and said shaft extends above the hopper and is supported above the hopper (see Fig. 1) from a laterally projecting arm 32 of the standard 12. The shaft 30 is intergeared at its upper end, as at 33, with a horizontal shaft 35 supported from the arm 32 and driven in any approved manner. The shaft 35 (see Figs. 1 and 2) is intergeared, as at 36, with a horizontal shaft 37 which extends into a chute 38 which is attached to a bracket 39 rigid with the arm 32, as shown in Fig. 2, and said chute is employed in feeding dry material, preferably consisting in the main of gypsum in a finely state, to the chamber 16 of the hopper. Within the chute 38 is a feed-wheel 40 for regulating the feed of material to the discharging end of the chute, and said feed-wheel is operatively mounted on the shaft 37. The arm 32 (see Fig. 1) also supports a water-supplying pipe 41 applied in any approved manner and provided with a valve 41ª and employed in feeding water to the hopper-chamber 16.

The hopper-body 15 is annular in cross-section, as shown in Fig. 3, and provided at its lower end with an external annular flange 42, and the bottom plate 17 of the hopper is spaced, in the main, downwardly from said body. The hopper is provided, at its lower end (see Figs. 1, 5, 6 and 7), with a substantially horizontal and radially arranged slideway 43 which is parallel with the axes of the pivotal connections between the hopper and the standard 12, and said slideway extends from adjacent the discharge-opening 18 to the exterior of the hopper and is engaged by a cut-off 45 arranged to control the feed of cementitious material through said opening and consisting of a horizontal metal plate which extends beyond the outer end of said slideway and externally of the hopper in the inner and closed position of the cut-off and rests on the bottom plate 17. Said slideway 43 is formed by and between the cut-off-supporting portion of the plate 17 and a horizontal plate 46 which is arranged next over said cut-off and recessed at its under side to form said slideway. Preferably the plate 46 extends from adjacent the opening 18 in the plate 17 not only to the outer end of the slideway 43 but under the adjacent portion of the flange 42 of the hopper-body 15, as shown in Figs. 5, 6 and 7, and is riveted, as at 47, to said flange at the adjacent side of the hopper, and the plate 17 (see Figs. 3, 5 and 7) extends from under the cut-off 45 to the opposite side of the hopper and has a marginal flange 48 arranged under the aforesaid flange 42 of the hopper-body and riveted, as at 49, at the last-mentioned side of the hopper, to said flange 42. As shown in Figs. 3, 5, 6 and 7, the plate 46 has its inner portion so slotted or contoured, as at 50, as to avoid interference with the passage, through the discharge-opening 18, of material from within the hopper-chamber 16.

The hopper (see Figs. 3, 4, 9 and 10) is provided adjacent the supporting member 26 with a laterally projecting arm 51 which has its outer end portion extending into and through a slot 52 formed in the upper end portion and extending to the upper extremity of said member 26, and said end portion of said arm is provided, between the side walls of said slot, with a slot 51ª extending laterally through said arm. A short shaft 53, which is parallel with the pivotal connections between the hopper and the standard 12, extends through the slot 51ª in the arm 51 and is supported from the member 26 and affords support to said arm. The shaft 53 is shown provided at one end with a hand-lever 54 for operating the shaft. Within the slot 51ª the shaft 53 has a diametrical enlargement 55 which is circular in cross-section and arranged to form an eccentric or cam interposed between the top and bottom walls of said slot, and said slot extends endwise of the arm 51 to accommodate raising of said arm from its lower position shown in Fig. 4 into its upper position shown in Fig. 10 by the eccentric or cam, or lowering of said arm from its upper position into its lower position by gravity, according as said shaft is rotated the extent required in the one or the other direction, and obviously the hopper is in its lower position shown in Figs. 1, 5, 6 and 7 in the lower position of the arm 51 and in its upper position shown in Fig. 8 in the upper position of said arm. It will be observed, therefore, that the top wall of the slot 51ª forms a downwardly facing surface arranged to cooperate with the enlargement or projection 55 of the shaft 53 in lifting the arm 51, and consequently the hopper, during the required rotation of said shaft in the lower position of the hopper.

The bottom plate 17 of the hopper (see Figs. 1, 5, 6, 7 and 8) is provided, at and next its under side and around the lower extremity of the opening 18, with packing consisting preferably of a sheet or layer 56 of elastic and compressible material such, for instance, as rubber. The elastic and compressible layer or packing 56 has such arrangement in relation to the path of the mold 20 that when said mold is under the hopper and in position to be charged from the hopper, as shown in Figs. 5, 6 and 7, said elastic and compressible layer or packing extends over every portion of the top edges of the mold without interfering with the passage of material through the opening 18 in the plate 17 into the chamber 29 of the mold. The elastic and compressible layer 56 is secured to the plate 17 preferably removably by screws 57. By the hereinbefore described construction it will be observed that the hopper is arranged over the path of the mold and has a limited movement from and toward said path and also has an outlet arranged to discharge into the material-receiving chamber of the mold when the mold is in its material-receiving position in relation to the hopper, and that the elastic and compressible member 56 of the hopper makes contact with the top edges of the mold when the hopper is in its lower position in the aforesaid position of the mold.

In operating our improved apparatus the hopper is lifted into its upper position shown in Fig. 8, if not already in said position, preparatory to moving the mold 20 into the required position under the hopper, and when said mold has been properly positioned under the hopper the shaft 53 is actuated as required to permit the hopper to lower by gravity into the position shown in Figs. 1, 5, 6 and 7, in which the elastic and compressible layer or packing 56 frictionally engages the top edges of the mold so as to insure the formation of a substantially fluid-tight joint between the hopper and the mold, and so as to hold the mold against displacement preparatory to and while charging the mold from the hopper, and we would here remark that the mold is beveled, as at 58, externally of its upper end to minimize the possibility of detrimental accumulation of cementitious matter on the top edges of the mold. The cut-off 45 is normally in its closed position and left in said position not only until the preparation of a suitable quantity of wet cementitious material in the hopper-chamber 16 but until the mold has been placed in its material-receiving position under the hopper and held in said position by the packing 56, as shown in Figs. 5 and 6, whereupon said cut-off is actuated outwardly into its fully open position shown in Fig. 7 so as to permit material to run from said chamber through the discharge-opening 18 into the mold. Upon charging the mold the cut-off 45 is closed, whereupon the shaft 53 is operated as required to lift the hopper from its lower position shown in Figs. 1, 5, 6 and 7 into its upper position shown in Fig. 8, to permit the removal of the charged mold from under the hopper. The small amount of cementitious material which may remain in the space surrounded by the packing 56, or in the discharge-opening 18 of the hopper, upon closing the cut-off 45, will be found useful, upon lifting the hopper into its upper position upon charging the mold, in insuring a complete filling of the mold.

Preferably the cut-off 45 (see Figs. 1, 3, 5, 7 and 8) is provided at its outer end with two clips 60 spaced transversely of the cut-off, and the hopper-body 15 is externally provided above the clips with outwardly projecting brackets 61 supporting a horizontal shaft 62 arranged at a right angle to the axes of the pivotal connections between the hopper and the standard 12 and transversely in relation to the path of the cut-off 45. The shaft 62 has a hand-lever 63 for operating the shaft. To each clip 60 is pivotally connected, as at 65, one end of a link 66 pivotally connected at its other end, as at 67, to a downwardly projecting arm 68 of the shaft 62, and the relative arrangement of the parts is such that the clips 60, the shaft 62 and its arms 68 and the links 66 constitute simple and highly practical mechanism for actuating the cut-off 45.

What we claim is—

1. In apparatus for making cementitious building blocks and the like, the combination, with a substantially horizontally movable mold having its material-receiving chamber open at its upper end, and a support for said mold, of a hopper adapted to be employed in supplying wet or moist cementitious material to said chamber and arranged over the path of said mold and having a limited movement from and toward said path and also having an outlet arranged to discharge into said chamber when the mold is in its material-receiving position in relation to the hopper, means for supporting the hopper, and a cut-off for controlling communication through said outlet, said hopper resting upon the mold in the lower position of the hopper, and the mold being movable substantially horizontally from under the hopper upon lifting the hopper from the mold after charging the mold from the hopper.

2. In apparatus of the character indicated, the combination, with a substantially horizontally movable mold having its material-receiving chamber open at its upper end, and a support for said mold, of a hopper adapted to be employed in supplying material to said chamber and arranged over the path of said mold and having movement from and toward said path and also having a discharge-opening arranged to discharge into said chamber when the mold is in its material-receiving position, means for supporting the hopper, and a cut-off controlling communication through said opening, the hopper being in contact with the top edges of the mold when the hopper is in its lower position in the aforesaid position of the mold.

3. Apparatus of the character indicated comprising a substantially horizontally movable mold having its material-receiving chamber open at its upper end, a support for the mold, a hopper arranged over the path of the mold and having a limited movement from and toward said path and provided at its lower end with a substantially horizontal slideway, means for supporting the hopper, and a cut-off engaging said slideway and consisting of a horizontal plate which extends beyond the outer end of the slideway, the bottom of the hopper comprising a substantially horizontal plate which is arranged next below and supports said cut-off and has an opening adapted to discharge into the aforesaid chamber when the mold is in its material-receiving position, said plate being provided, at and next its under side and around the lower end of said opening, with packing which makes contact with the mold when the hopper is in its lower position in said position of the mold, and the aforesaid cut-off controlling communication through said opening.

4. In apparatus of the character indicated, the combination, with a substantially horizontally movable mold beveled externally at its upper end and having its material-receiving chamber open at its upper end, and a support for the mold, of a hopper arranged over the path of said mold and having movement from and toward said path and provided at its lower end with a substantially horizontal slideway, means for supporting the hopper, a cut-off engaging said slideway, and means for actuating said cut-off, the bottom of the hopper comprising a substantially horizontal plate which extends under said cut-off and has an opening arranged to discharge into the aforesaid chamber when the mold is in its material-receiving position, the hopper resting on the mold in the lower position of the hopper, and the aforesaid cut-off controlling communication through the aforesaid opening.

5. In apparatus of the character indicated, the combination, with a horizontally movable mold having its material-receiving chamber open at its upper end, and a support for the mold, of a hopper arranged over the path of the mold and movable from and toward said path and provided at its lower end with a substantially horizontal slideway, means for supporting said hopper, and a cut-off engaging said slideway, the bottom of the hopper comprising a substantially horizontal plate which extends under said cut-off and has an opening adapted to discharge into the aforesaid chamber when the mold is in its material-receiving position, said plate being provided at its under side and around the lower end of said opening with a layer of elastic and compressible material, the aforesaid cut-off controlling communication through said opening, and the aforesaid elastic and compressible layer being arranged to form the joint between the aforesaid plate and the mold when the hopper is in its lower position in the aforesaid position of the mold.

6. Apparatus of the character indicated comprising a horizontally movable mold having its material-receiving chamber open at its upper end, a support for the mold, a hopper arranged over the path of the mold and movable from and toward said path and provided at its bottom with a dischage-opening adapted to discharge into said chamber when the mold is in its material-receiving position, a cut-off controlling communication through said opening and supported from the hopper, means for actuating said cut-off, means whereby a substantially fluid-tight joint is formed between the hopper and the mold when the hopper is in its lower position in the aforesaid position of the mold, and means whereby the hopper when it is in its lower position may be lifted from the mold.

7. In apparatus of the character indicated, the combination, with stationary framework, a substantially horizontally movable mold supported from said framework and having its material-receiving chamber open at its upper end, and a hopper arranged over the path of said mold and movable from and toward said path and provided at its bottom with a discharge-opening arranged to discharge into said chamber when the mold is in its material-receiving position, of a substantially horizontal shaft at one side and externally of and spaced from the hopper and supported from the aforesaid framework and having a projection, vertically spaced parallel rigid links at the opposite side of the hopper and pivotally connected to said hopper and to said framework and movable in a vertical plane, and a cut-off controlling communication through the aforesaid opening, the hopper being in contact with the mold when the hopper is in its lower position in the aforesaid position of the mold and being provided externally with an arm which is arranged adjacent the aforesaid shaft and has a downwardly facing surface arranged to cooperate with the aforesaid projection in lifting said arm during the required rotation of the shaft in the lower position of the hopper.

8. In apparatus of the character indicated, the combination, with stationary framework, a horizontally movable mold supported from said framework and having its material-receiving chamber open at its upper end, and a hopper arranged over the path of the mold and having movement from and toward said path and provided at its lower end with an opening adapted to discharge into said chamber in the material-receiving position of the mold, said hopper being externally provided with a laterally projecting rigid arm having a slot extending laterally through and endwise of the arm, of a substantially horizontal shaft extending through said slot and supported from the aforesaid framework and having a diametrical enlargement forming an eccentric or cam interposed between the top and bottom walls of said slot, paralled links arranged at the opposite side of the hopper and pivotally connected to the hopper and to said framework and movable in a vertical plane, and a cut-off controlling communication through the aforesaid opening, the hopper being in contact with the mold when the hopper is in its lower position in the aforesaid position of the mold, and the top wall of the aforesaid slot and the aforesaid enlargement of the aforesaid shaft being arranged to cooperate in lifting the aforesaid arm during the required rotation of the shaft in said position of the hopper.

9. Apparatus of the character indicated comprising a hopper provided at its lower end with a substantially horizontal slideway and having a body which is annular in cross-section and at its lower end has an external annular flange, and a cut-off engaging and movable endwise of said slideway, the hopper comprising a substantially horizontal bottom plate which is spaced in the main downwardly from the hopper-body and supports said cut-off and has a central discharge-opening, said cut-off being arranged to control the feed of material through said opening and extending beyond the outer end of the aforesaid slideway in the inner position of the cut-off, said slideway extending from adjacent said opening to the exterior of the hopper, the hopper also comprising a horizontal plate extending over the aforesaid cut-off from adjacent said opening toward the outer end of the slideway and under and secured to the aforesaid flange at the adjacent side of the hopper, and the first-mentioned plate extending from under the cut-off inwardly to the opposite side of the hopper and having a marginal flange arranged under and secured to said flange at the last-mentioned side of the hopper.

10. In apparatus of the character indicated, the combination, with a hopper having a discharge-opening at its lower end and a slideway which extends from adjacent said opening to the exterior of the hopper, means for supporting said hopper, and a cut-off engaging the aforesaid slideway and controlling communication through said opening and consisting of a horizontal plate which extends beyond the outer end of the slideway and externally of the hopper in the inner position of the cut-off, of a horizontal shaft arranged externally of the hopper and above and transversely of the path of the cut-off and supported from the hopper and having spaced downwardly projecting arms, and links operatively connecting said cut-off with said arms.

11. In apparatus of the character indicated, the combination, with a hopper having a discharge-opening at its lower end and a substantially horizontal slideway which is formed between said plate and the hopper-body and extends from adjacent said opening to the exterior of the hopper, and means for supporting the hopper, of a cut-off consisting of a substantially horizontal plate engaging the aforesaid slideway and controlling communication through the aforesaid opening and extending beyond the outer end of the slideway and provided at its outer end with clips spaced transversely of the cut-off, and a horizontal shaft arranged externally of and supported from the hopper and operatively connected with said clips.

In testimony whereof, we sign the foregoing specification, this 6th day of January, 1923.

OTTO E. BORNHAUSER.
JOHN EDWARD HERMAN.